US012769050B2

(12) United States Patent
Ollanik et al.

(10) Patent No.: US 12,769,050 B2
(45) Date of Patent: Oct. 20, 2026

(54) VOLUMETRIC WAVEGUIDES IN GLASS FOR OPTICAL FEEDTHROUGH TO VACUUM

(71) Applicant: Quantinuum LLC, Broomfield, CO (US)

(72) Inventors: Adam Jay Ollanik, Boulder, CO (US); David M. Gaudiosi, Loveland, CO (US); Duc Anh Nguyen, Westminster, CO (US)

(73) Assignee: Quantinuum LLC, Broomfield, CO (US)

(*) Notice: Subject to any disclaimer, the term of this patent is extended or adjusted under 35 U.S.C. 154(b) by 271 days.

(21) Appl. No.: 18/757,166

(22) Filed: Jun. 27, 2024

(65) Prior Publication Data

US 2025/0060527 A1 Feb. 20, 2025

Related U.S. Application Data

(60) Provisional application No. 63/602,979, filed on Nov. 27, 2023, provisional application No. 63/519,328, filed on Aug. 14, 2023.

(51) Int. Cl.
*F21V 8/00* (2006.01)
*B01J 3/03* (2006.01)
(Continued)

(52) U.S. Cl.
CPC .............. *G02B 6/0095* (2013.01); *B01J 3/03* (2013.01); *G02B 6/0065* (2013.01); *G06N 10/20* (2022.01);
(Continued)

(58) Field of Classification Search
None
See application file for complete search history.

(56) References Cited

U.S. PATENT DOCUMENTS 3,951,515 A * 4/1976 Allard .................. G02B 6/4428 340/850
4,360,249 A * 11/1982 Slemon ................ G02B 6/4428 385/33

(Continued)

FOREIGN PATENT DOCUMENTS

CN 216286755 U 4/2022
WO 2019/092412 A1 5/2019

OTHER PUBLICATIONS

Oh, Jaewon, et al., "Metasurfaces for Free-Space Coupling to Multicore Fibers", Journal of Lightwave Technology, Apr. 1, 2024 (initially published Nov. 21, 2023), pp. 2385-2396, vol. 42, No. 7, IEEE, US.

(Continued)

*Primary Examiner* — Jerry Rahll
(74) *Attorney, Agent, or Firm* — Alston & Bird LLP

(57) ABSTRACT

A window component of a controlled environment chamber is provided. The window component includes a window plate; a first array of coupling elements disposed on a first surface of the window plate; a second array of coupling elements disposed on a second surface of the window plate; and a plurality of waveguides formed in a volume of the window plate between the first and second surfaces. A respective waveguide of the plurality of waveguides optically connects a respective first coupling element of the first array of coupling elements to a respective coupling element of the second array of coupling elements.

20 Claims, 8 Drawing Sheets

Figure 1:
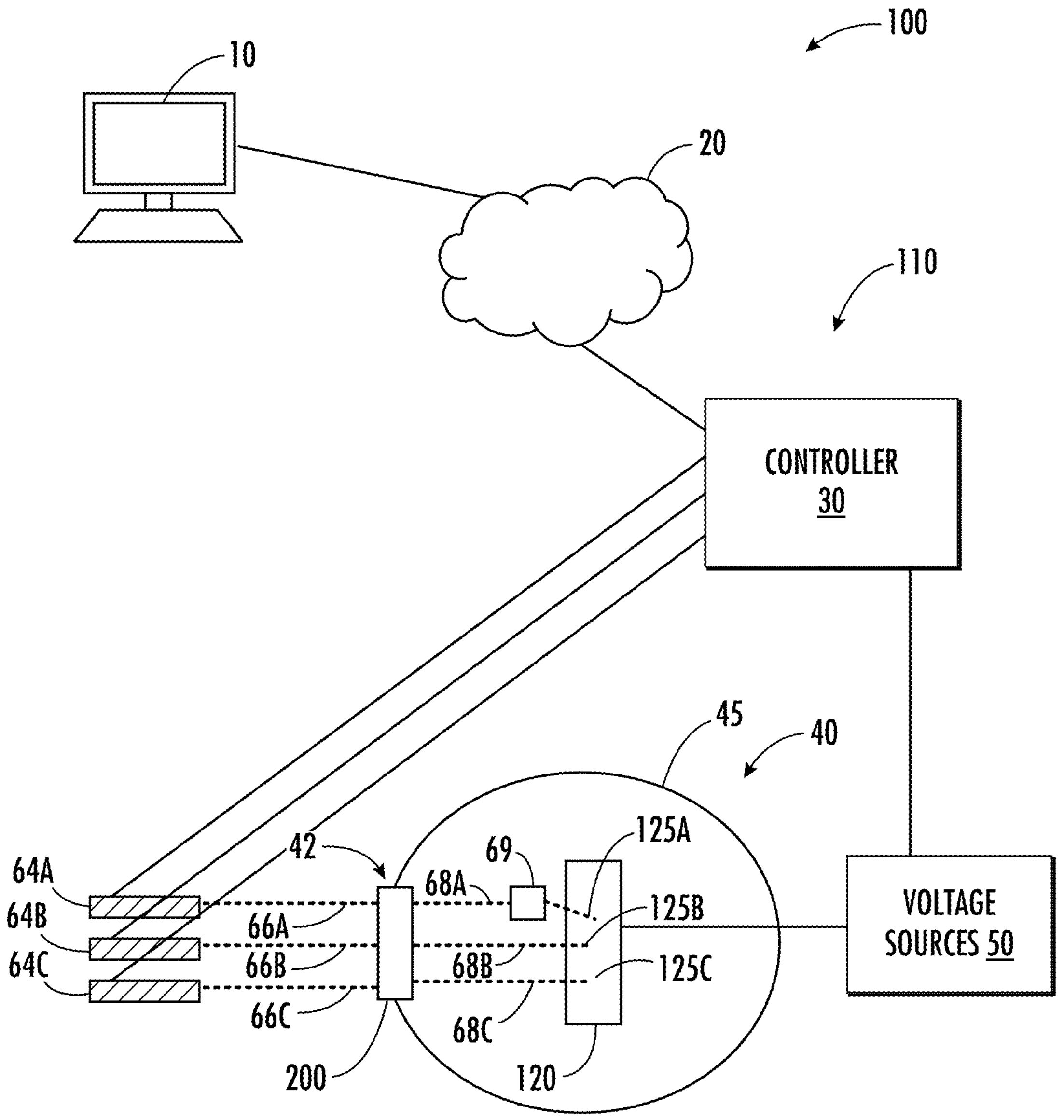

(51) Int. Cl.

| | |
|---|---|
| ***G06N 10/20*** | (2022.01) |
| *G21K 1/06* | (2006.01) |
| *G21K 1/20* | (2026.01) |

(52) U.S. Cl.

CPC .................. *G21K 1/06* (2013.01); *G21K 1/20* (2026.01); *G21K 2201/067* (2013.01)

(56) References Cited

U.S. PATENT DOCUMENTS

| | | | | |
|---|---|---|---|---|
| 4,682,846 | A | 7/1987 | Cowen | |
| 4,690,487 | A | 9/1987 | Hale et al. | |
| 5,151,967 | A | 9/1992 | Ebinuma | |
| 6,163,642 | A | 12/2000 | Huppenthal | |
| 6,215,366 | B1 | 4/2001 | Kern et al. | |
| 8,260,106 | B2 * | 9/2012 | Jin | G02B 6/4428 385/138 |
| 12,436,500 | B2 | 10/2025 | Cuche et al. | |
| 2009/0232454 | A1 * | 9/2009 | Takahashi | G02B 6/3825 385/54 |
| 2014/0231133 | A1 * | 8/2014 | Fritz | G21C 13/06 174/650 |
| 2017/0123171 | A1 * | 5/2017 | Goutzoulis | G02B 6/3825 |
| 2017/0139147 | A1 * | 5/2017 | Baaijens | G02B 6/3816 |
| 2021/0333154 | A1 * | 10/2021 | Uyeno | G01J 5/061 |
| 2021/0410266 | A1 | 12/2021 | Saffman et al. | |
| 2022/0171332 | A1 * | 6/2022 | Cuche | G02B 23/2492 |
| 2022/0327414 | A1 | 10/2022 | Bohn et al. | |
| 2023/0194884 | A1 * | 6/2023 | Hughes | G02B 27/0905 359/601 |
| 2024/0141503 | A1 | 5/2024 | Ertsgaard et al. | |
| 2024/0145237 | A1 | 5/2024 | Ertsgaard et al. | |
| 2025/0060526 | A1 | 2/2025 | Ollanik et al. | |

OTHER PUBLICATIONS

U.S. Non-Provisional Patent Application for "Optics-Integrated Confinement Apparatus including Polarization Controlling Optical Elements", Unpublished (Filed Jun. 5, 2024), Adam Jay Ollanik (Inventor), Quantinuum LLC (Applicant), 18734552.

Wikipedia Contributors, "Gaussian Beam", Wikipedia, The Free Encyclopedia, Feb. 25, 2002, retrieved from the Internet at https://en.wikipedia.org/wiki/Gaussian_beam on Aug. 22, 2024, 18 pages.

Outgoing—ISA/210—International Search Report Mailed on Nov. 25, 2024 for WO Application No. PCT/US24/041,250, 4 page(s).

Outgoing Written Opinion of the ISA Mailed on Nov. 25, 2024 for WO Application No. PCT/US24/041250, 7 page(s).

Non-Final Rejection Mailed on May 29, 2026 for U.S. Appl. No. 18/757,109, 11 page(s).

* cited by examiner

VOLUMETRIC WAVEGUIDES IN GLASS FOR OPTICAL FEEDTHROUGH TO VACUUM

CROSS-REFERENCE TO RELATED APPLICATION

This application claims priority to Provisional Patent Application No. 63/519,328, filed Aug. 14, 2023, and Provisional Patent Application No. 63/602,979, filed Nov. 27, 2023, the contents of each of which are hereby incorporated by reference in their entireties.

TECHNICAL FIELD

Various embodiments relate to a controlled environment chamber and/or a window component of a controlled environment chamber. For example, various embodiments relate to an optical feedthrough formed in a window component of a controlled environment chamber.

BACKGROUND

In various scenarios, it is desirable to pass optical signals from outside a controlled environment chamber to the inside of a controlled environment chamber, or vice versa. For example, the optical signals may include laser beams used to perform experiments on quantum objects (e.g., ions, atoms, quantum dots, and/or the like) confined within the controlled environment chamber. In another example, the optical signals may include fluorescence signals generated by quantum objects confined within the controlled environment chamber. However, forming an opening in the housing of the controlled environment chamber to act as an optical fiber feedthrough decreases the efficiency with which the controlled environment within the controlled environment chamber may be controlled. Through applied effort, ingenuity, and innovation many deficiencies of such systems have been solved by developing solutions that are structured in accordance with the embodiments of the present invention, many examples of which are described in detail herein.

BRIEF SUMMARY OF EXAMPLE EMBODIMENTS

Example embodiments provide controlled environment chambers, window components for controlled environment chambers, methods of manufacturing window components and controlled environment chambers comprising such window components. For example, a window component may include a window plate having a first surface and a second surface. A first array of coupling elements are formed on and/or in the first surface of the window plate and a second array of coupling elements are formed on and/or in the second surface of the window plate. A plurality of waveguides are formed in the volume of the window plate between the first surface and the second surface. A respective waveguide of the plurality of waveguides optically connects a respective first coupling element of the first array of coupling elements and a respective second coupling element of the second array of coupling elements. The coupling elements are configured for coupling light into and/or out of the waveguide (e.g., from or to an optical fiber, free space optics, and/or the like).

According to one aspect, window component of a controlled environment chamber is provided. In an example embodiment, the window component includes a window plate; a first array of coupling elements disposed on a first surface of the window plate; a second array of coupling elements disposed on a second surface of the window plate; and a plurality of waveguides formed in a volume of the window plate. A respective waveguide of the plurality of waveguides optically connects a respective first coupling element of the first array of coupling elements to a respective coupling element of the second array of coupling elements.

In an example embodiment, the window component includes a collar, wherein the window plate is secured within the collar and the collar is configured to couple the window component to a chamber housing of the controlled environment chamber.

In an example embodiment the window plate comprises glass.

In an example embodiment, the window plate is a glass plate or pane.

In an example embodiment, the plurality of waveguides are formed in the volume of the window plate by modifying the refractive index of respective portions of the window plate.

In an example embodiment, at least one of the respective first coupling element or the respective second coupling element is a respective fiber housing.

In an example embodiment, the respective fiber housing is configured to receive and retain an optical fiber therein.

In an example embodiment, the respective fiber housing is configured to align a core of the optical fiber with the respective waveguide.

In an example embodiment, the respective first coupling element and the respective second coupling element are configured to couple light at least one of into or out of the respective waveguide.

In an example embodiment, at least one of the respective first coupling element or the respective second coupling element is a respective optical element.

In an example embodiment, the respective optical element is one or more of a diffractive optical component, a refractive optical component, or a metasurface.

In an example embodiment, at least one coupling element of the first array of coupling elements is positioned proximate to a respective waveguide of the plurality of waveguides to provide for evanescent-wave coupling between an optical component positioned within the at least one coupling element and the respective waveguide.

According to another aspect, a method of fabricating a window component of a controlled environment chamber is provided. In an example embodiment, the method includes forming a first array of coupling elements on a first surface of a window plate; forming a second array of coupling elements on a second surface of the window plate; and forming a plurality of waveguides in a volume of the window plate such that a respective waveguide of the plurality of waveguides optically connects a respective first coupling element of the first array of coupling elements and a respective second coupling element of the second array of coupling elements.

In an example embodiment, forming the plurality of waveguides in the volume of the window plate comprises modifying the refractive index of respective portions of the window plate.

In an example embodiment, the refractive index of the respective portions of the window plate are modified via at least one of femto-second laser processing or ion implantation.

In an example embodiment, at least one of (a) forming the respective first coupling element on the first surface of the window plate comprises boring a first fiber housing into the first surface or (b) forming the respective second coupling element on the second surface of the window plate comprises boring a second fiber housing into the second surface.

In an example embodiment, at least one of (a) forming the respective first coupling element on the first surface of the window plate comprises forming or securing a first optical element on the first surface or (b) forming the respective second coupling element on the second surface of the window plate comprises forming or securing a second optical element on the second surface.

In an example embodiment, the first and/or second optical elements are one or more of a diffractive optical component, a refractive optical component, or a metasurface.

In an example embodiment, the method further includes securing the window plate within a collar, wherein the collar is configured to couple the window component to a chamber housing of the controlled environment chamber.

According to another aspect, a controlled environment chamber is provided. In an example embodiment, the controlled environment chamber includes a chamber housing; and a window component secured to the chamber housing. The window component includes a window plate; a first array of coupling elements disposed on a first surface of the window plate; a second array of coupling elements disposed on a second surface of the window plate; and a plurality of waveguides formed in a volume of the window plate. A respective waveguide of the plurality of waveguides optically connects a respective first coupling element of the first array of coupling elements to a respective coupling element of the second array of coupling elements.

In an example embodiment, the window component seals an opening in the chamber housing.

In an example embodiment, the controlled environment chamber is at least one of a cryogenic chamber or a vacuum chamber.

In an example embodiment, the window component includes a collar, wherein the window plate is secured within the collar and the collar is configured to couple the window component to a chamber housing of the controlled environment chamber.

In an example embodiment the window plate comprises glass.

In an example embodiment, the window plate is a glass plate or pane.

In an example embodiment, the plurality of waveguides are formed in the volume of the window plate by modifying the refractive index of respective portions of the window plate.

In an example embodiment, at least one of the respective first coupling element or the respective second coupling element is a respective fiber housing.

In an example embodiment, the respective fiber housing is configured to receive and retain an optical fiber therein.

In an example embodiment, the respective fiber housing is configured to align a core of the optical fiber with the respective waveguide.

In an example embodiment, the respective first coupling element and the respective second coupling element are configured to couple light at least one of into or out of the respective waveguide.

In an example embodiment, at least one of the respective first coupling element or the respective second coupling element is a respective optical element.

In an example embodiment, the respective optical element is one or more of a diffractive optical component, a refractive optical component, or a metasurface.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides block diagram of an example system comprising a controlled environment chamber, in accordance with an example embodiment.

Figure 2:
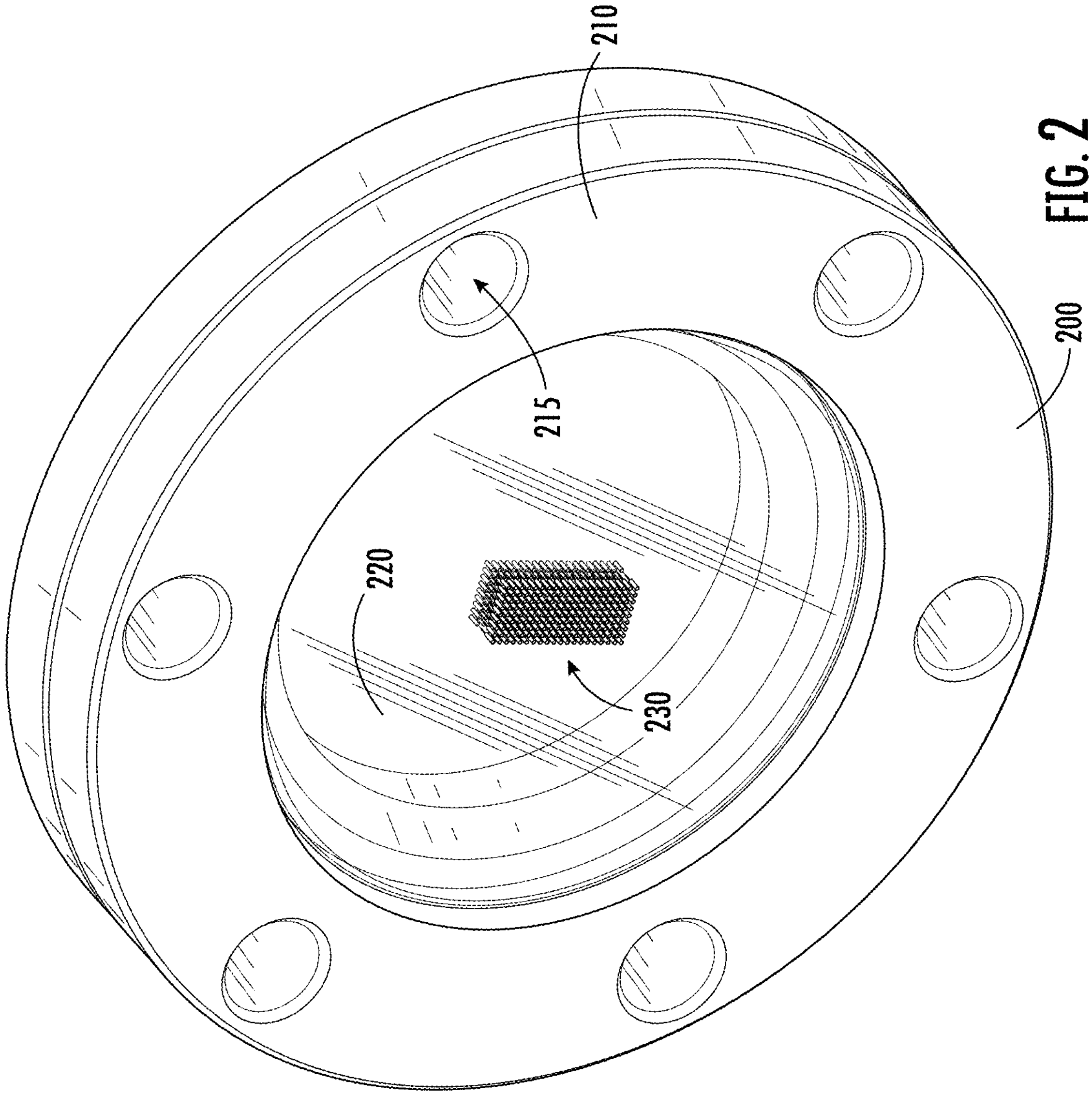

FIG. 2 provides a perspective view of a window component, in accordance with an example embodiment.

Figure 3:
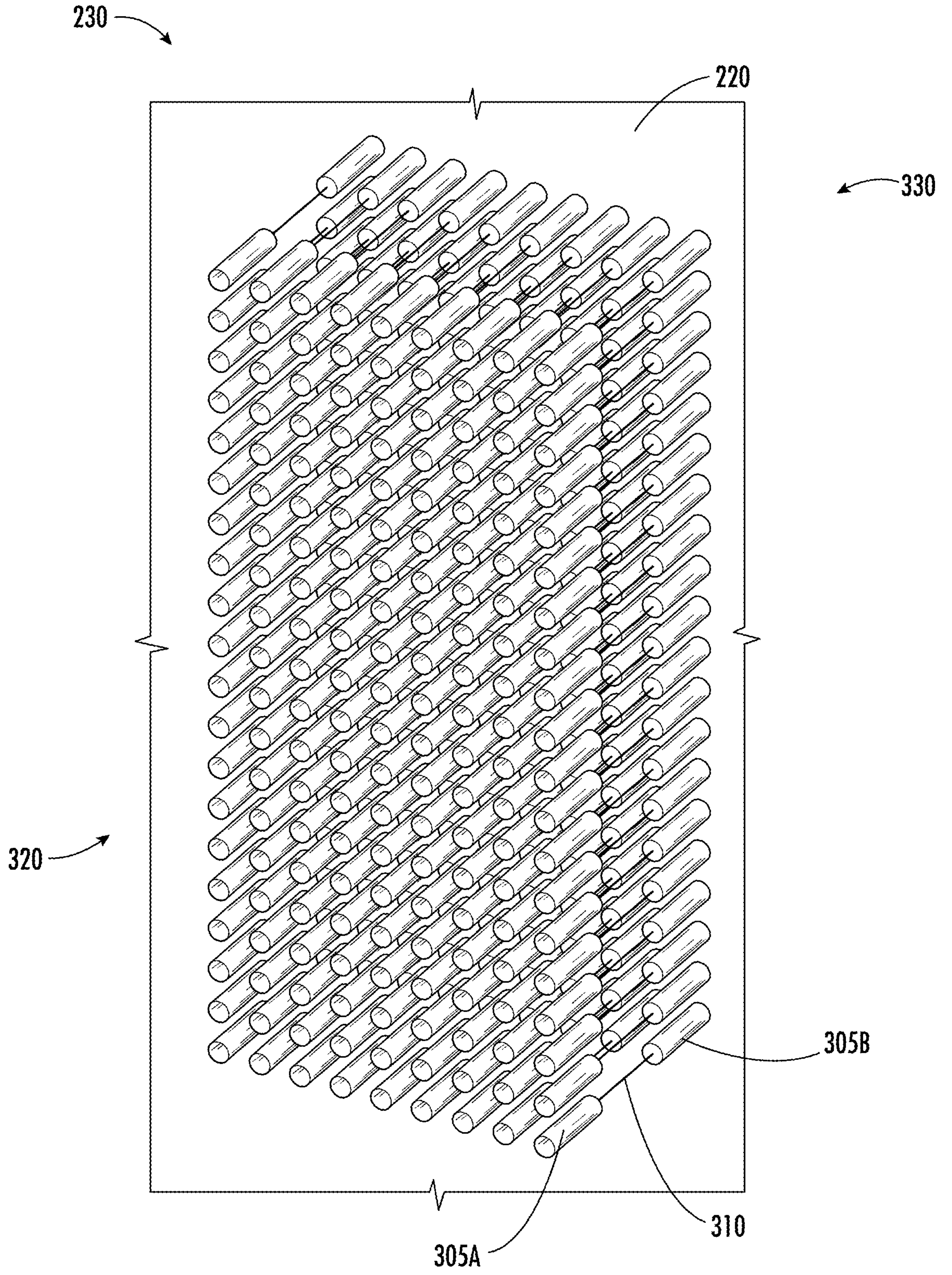

FIG. 3 provides a perspective view of a portion of a window component, in accordance with an example embodiment.

Figure 4:
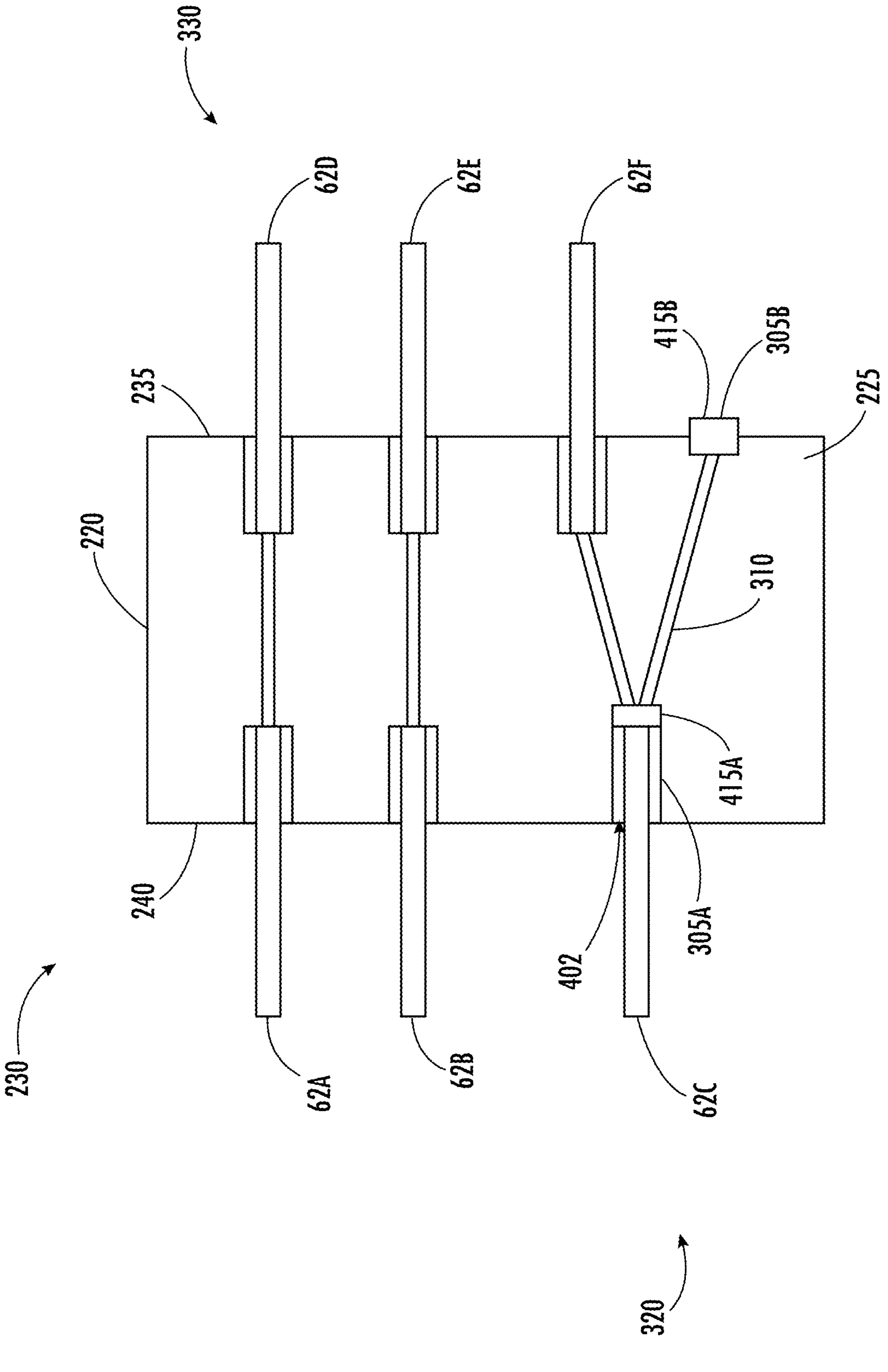

FIG. 4 provides a cross-sectional view of a portion of a window component, in accordance with an example embodiment.

Figure 5:
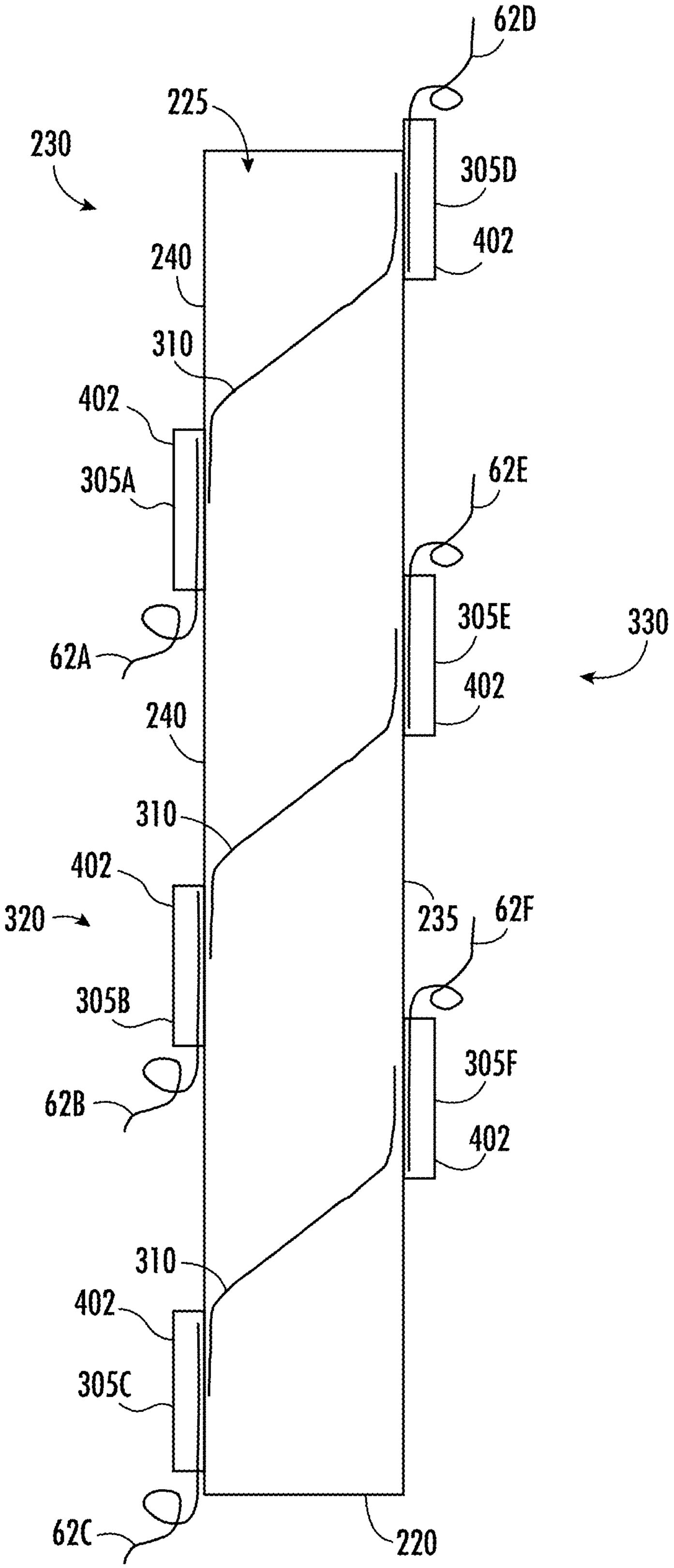

FIG. 5 provides a cross-sectional view of a portion of a window component, in accordance with an example embodiment.

Figure 6:
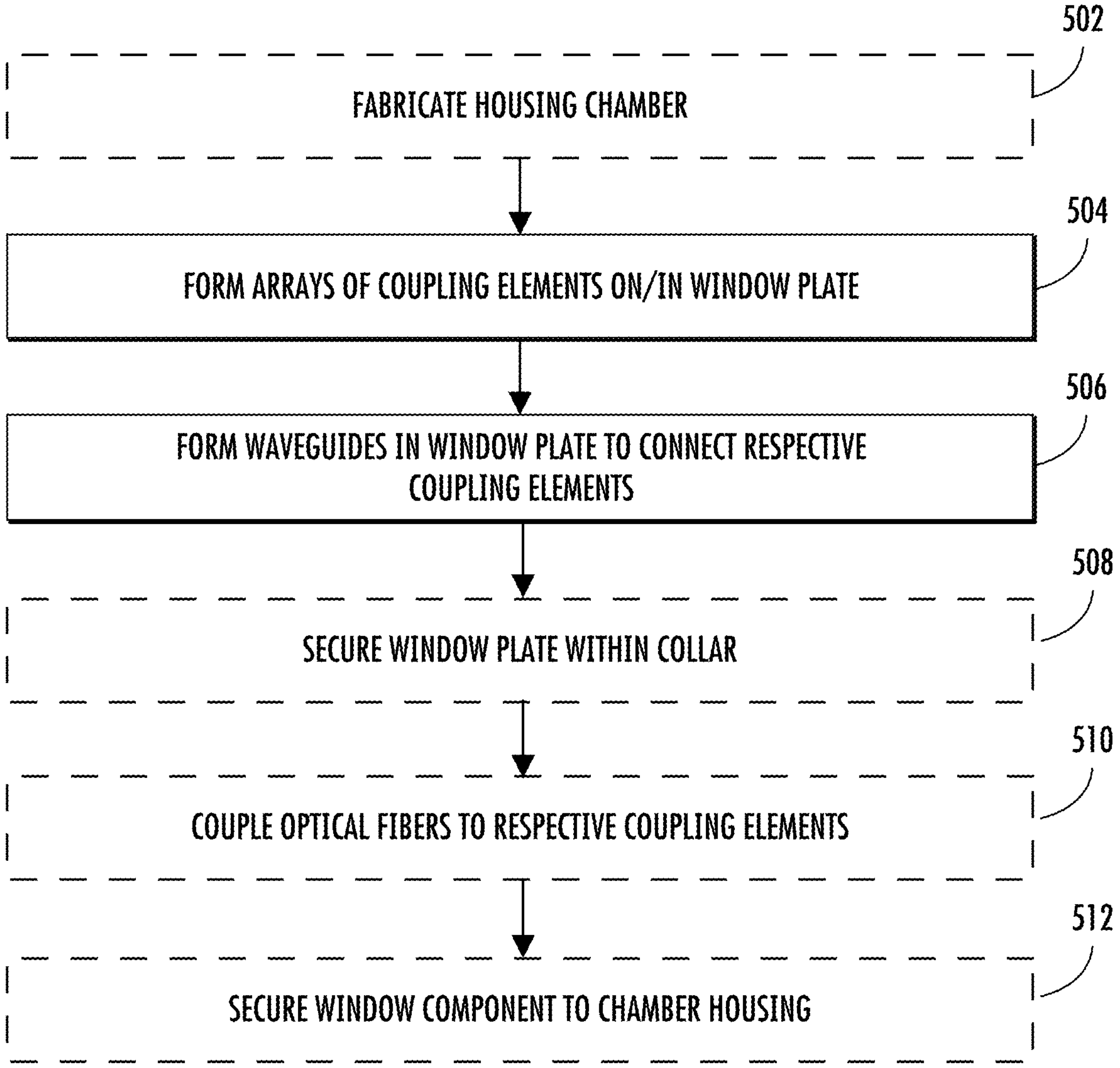

FIG. 6 provides a flowchart illustrating various processes and/or procedures for fabricating a window component and/or a controlled environment chamber including a window component, in accordance with an example embodiment.

Figure 7:
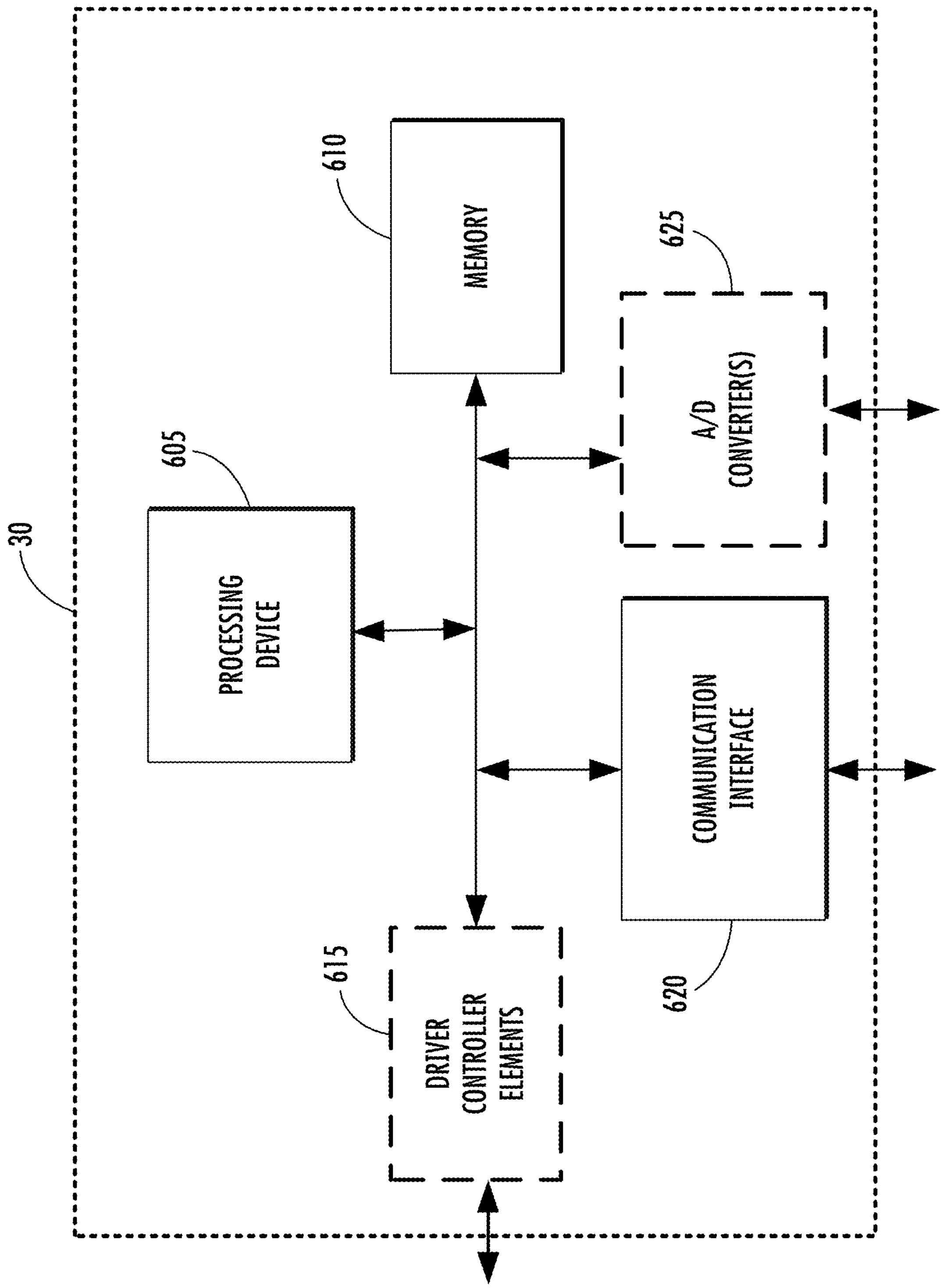

FIG. 7 provides a schematic diagram of an example controller of a quantum computer comprising a confinement apparatus disposed within a controlled environment chamber, in accordance with an example embodiment.

Figure 8:
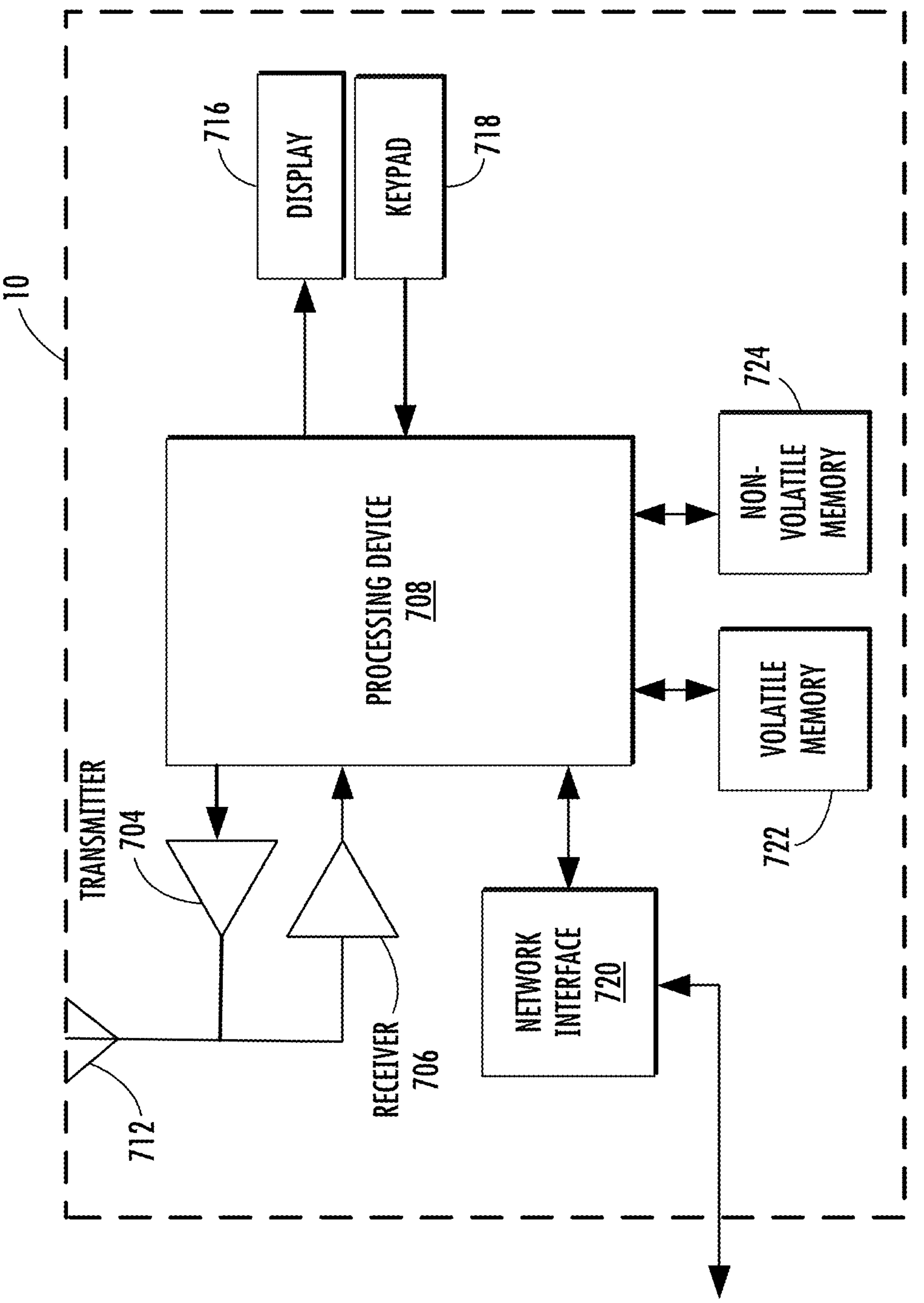

FIG. 8 provides a schematic diagram of an example classical computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within applicable engineering and/or manufacturing tolerances and/or within user measurement capabilities, unless otherwise indicated. Like numbers refer to like elements throughout.

In various scenarios, a controlled environment chamber is used to provide a controlled environment. For example, the controlled environment chamber may be a cryogenic and/or vacuum chamber configured for providing a temperature controlled and/or pressure controlled environment within the controlled environment chamber. For example, experiments may be performed within a controlled environment (e.g., a temperature controlled, humidity controlled, pressure controlled, and/or the like) inside the controlled environment chamber. In various instances, it is desirable to pass optical signals from outside the controlled environment chamber to the inside of a controlled environment chamber, or vice versa. For example, the optical signals may include laser beams used to perform experiments on quantum objects (e.g., ions, atoms, quantum dots, and/or the like)

confined within the controlled environment chamber. In another example, the optical signals may include fluorescence signals generated by quantum objects confined within the controlled environment chamber.

However, forming an opening in the housing of the controlled environment chamber to act as an optical fiber feedthrough decreases the efficiency with which the controlled environment within the controlled environment chamber may be controlled. For example, an opening in a housing of a vacuum chamber may limit the pressure to which the environment within the vacuum chamber may be reduced. Moreover, an opening in the housing of the vacuum chamber or using a different material for a feedthrough can add thermal expansion complications or reduce the mechanical stability of the housing. Therefore, technical problems exist regarding how to pass optical signals through the chamber housing of a controlled environment chamber without negatively affecting the operability of the controlled environment chamber.

Various embodiments provide technical solutions to these technical problems. For example, various embodiments provide a window component for a controlled environment chamber that includes coupling components and waveguides optically coupling and/or connecting respective coupling components disposed on a first surface of a window plate and a respective coupling elements disposed on a second surface of the window plate. Optical beams may therefore be passed through the window plate via the waveguides. The window component seals an opening in the housing chamber of the controlled environment chamber and provides means for passing optical signals therethrough. Moreover, the window component retains the mechanical stability of the housing. Thus, various embodiments provide improvements to controlled environment chambers and systems including controlled environment chambers.

Example System Including a Controlled Environment Chamber

FIG. 1 provides a schematic diagram of an example system 100 that includes a controlled environment chamber 40. The illustrated example system 100 is a quantum computing system comprising a confinement apparatus 120 (e.g., an ion trap, an atomic trap) configured to confine quantum objects (e.g., neutral or ionic atoms; neutral, ionic, or multipolar molecules; quantum dots; and/or other quantum particles) disposed within a controlled environment chamber 40. The controlled environment chamber 40 comprises a chamber housing 45 having an opening 42 formed therein. The controlled environment chamber 40 further comprises a window component 200 configured to environmentally seal the opening 42. For example, the window component 200 may prevent air from the environment outside of the chamber housing from entering the controlled environment chamber 40 via the opening 42.

In various embodiments, the controlled environment chamber 40 is configured to provide a controlled environment inside the chamber housing 45. For example, the temperature, pressure, humidity, atmospheric make up and/or contents, and/or the like may be controlled within the controlled environment chamber 40. In an example embodiment, the controlled environment chamber 40 is a cryogenic and/or pressure chamber.

In various embodiments, the controlled environment chamber 40 is a part of a system 100 configured for performing experiments, controlled quantum state evolution, and/or the like on quantum objects confined by a confinement apparatus 120 within the controlled environment chamber 40. In the illustrated system 100 of the quantum computer system, the system 100 comprises a computing entity 10 and a quantum computer 110.

In various embodiments, the quantum computer 110 comprises a controller 30, a controlled environment chamber 40 enclosing a confinement apparatus 120, one or more manipulation sources 64 (e.g., 64A, 64B, 64C), one or more voltage sources 50, one or more magnetic field generators, an optics collection system, and/or the like. In various embodiments, the controller 30 is configured to control the operation of (e.g., control one or more drivers configured to cause operation of) the manipulation sources 64, voltage sources 50, magnetic field generators, a vacuum system and/or cryogenic cooling system (not shown), and/or the like. In various embodiments, the controller 30 is configured to receive signals (e.g., electrical signals) generated and provided by one or more photodetectors of the optics collection system.

In an example embodiment, the one or more manipulation sources 64 may comprise one or more lasers (e.g., optical lasers, microwave sources and/or masers, and/or the like) or another manipulation source. In various embodiments, the one or more manipulation sources 64 are configured to manipulate and/or cause a controlled quantum state evolution of one or more quantum objects confined by the confinement apparatus 120. For example, a respective manipulation source 64 is configured to generate and/or provide a respective manipulation signal (e.g., an optical signal) configured to be incident one or more quantum objects located at a respective target location 125 (e.g., 125A, 125B, 125C) defined at least in part by the confinement apparatus 120.

A respective manipulation source 64 emits a respective manipulation signal and the respective manipulation signal is guided to the controlled environment chamber via a respective external beam path system 66 (e.g., 66A, 66B, 66C). In various embodiments, a respective external beam path system 66 comprises a respective optical fiber, free space optics, photonic integrated circuit, and/or the like. The respective manipulation signal is coupled into a waveguide of the window component 200 via a first coupling element of the window component 200. The respective manipulation signal is then coupled from the waveguide into a respective internal beam path system 68 (e.g., 68A, 68B, 68C) via a second coupling element. In various embodiments, the respective internal beam path system comprises a respective optical fiber, free space optics, photonic integrated circuit 69 and/or the like. In various embodiments, the respective internal beam path system 68 is configured to cause the respective manipulation signal to be incident on the respective target location 125. In various embodiments, the manipulation sources 64, active components of the external and internal beam path systems 66, 68 (e.g., modulators, etc.), and/or other components of the quantum computer 110 are controlled by the controller 30.

In various embodiments, the confinement apparatus 120 is an ion trap, such as a surface ion trap, Paul ion trap, and/or the like. In various embodiments, the confinement apparatus 120 is an optical trap, magnetic trap, and/or other confinement apparatus configured to confine quantum objects. In various embodiments, the quantum objects are neutral or ionic atoms; neutral, ionic, or multipolar molecules; quantum dots; and/or other quantum particles.

In various embodiments, the quantum computer 110 comprises one or more voltage sources 50. For example, the voltage sources may be arbitrary wave generators (AWG), digital analog converters (DACs), and/or other voltage signal generators. For example, the voltage sources 50 may comprise a plurality of control voltage drivers and/or voltage sources and/or at least one RF driver and/or voltage source. The voltage sources 50 may be electrically coupled to the corresponding potential generating elements (e.g., control electrodes and/or RF electrodes, and/or the like) of the confinement apparatus 120, in an example embodiment. In various embodiments, the controller 30 is configured to control operation of the one or more voltage sources 50.

In various embodiments, the quantum computer 110 comprises an optics collection system configured to collect and/or detect photons (e.g., stimulated emission and/or fluorescence) generated by quantum objects confined by the confinement apparatus 120 (e.g., during qubit reading procedures). The optics collection system may comprise one or more optical elements (e.g., lenses, mirrors, waveguides, fiber optics cables, and/or the like) and one or more photodetectors. In various embodiments, the photodetectors may be photodiodes, photomultipliers, charge-coupled device (CCD) sensors, complementary metal oxide semiconductor (CMOS) sensors, Micro-Electro-Mechanical Systems (MEMS) sensors, and/or other photodetectors that are sensitive to light at an expected fluorescence wavelength of the qubits (e.g., atomic objects) of the quantum computer 110. In various embodiments, the photodetectors may be in electronic communication with the quantum computer controller 30 via one or more A/D converters 625 (see FIG. 7) and/or the like. In an example embodiment, the photodetectors are disposed inside the controlled environment chamber 40. In an example embodiment, the photodetectors are disposed outside the controlled environment chamber 40 and photons collected by the optical collection system are provided to the photodetectors via an internal beam path system 68, one or more waveguides of the window component 200, and an external beam path system 66.

In various embodiments, a computing entity 10 is configured to allow a user to provide input to the quantum computer 110 (e.g., via a user interface of the computing entity 10) and receive, view, and/or the like output from the quantum computer 110. The computing entity 10 may be in communication with the controller 30 of the quantum computer 110 via one or more wired or wireless networks 20 and/or via direct wired and/or wireless communications. In an example embodiment, the computing entity 10 may translate, configure, format, and/or the like information/data, quantum computing algorithms (e.g., quantum circuits), and/or the like into a computing language, executable instructions, command sets, and/or the like that the controller 30 can understand, execute, and/or implement.

In various embodiments, the controller 30 is configured to control operation of the voltage sources 50, magnetic field generators, cryogenic system and/or vacuum system controlling the temperature and pressure within the controlled environment chamber 40 (and/or other systems configured to control the environment within the controlled environment chamber 40), manipulation sources 64, so as to manipulate and/or cause a controlled evolution of quantum states of one or more quantum objects confined by the confinement apparatus 120, and/or read and/or detect a quantum (e.g., qubit) state of one or more quantum objects confined by the confinement apparatus. For example, the controller 30 may cause a controlled evolution of quantum states of one or more quantum objects within the confinement apparatus to execute a quantum circuit and/or algorithm. For example, the controller 30 may read and/or detect quantum states of one or more quantum objects within the confinement apparatus 120 at one or more points during the execution of a quantum circuit. In various embodiments, the quantum objects confined by the confinement apparatus 120 are used as qubits of the quantum computer 110.

Example Window Component

FIG. 2 provides a perspective view of an example window component 200. In various embodiments, the window component 200 comprises a window plate 220 that is secured within a collar 210. The collar comprises fastening elements 215 configured for use in securing the window component to the chamber housing 45 of the controlled environment chamber 40. For example, in the illustrated embodiment, the fastening elements 215 comprise holes that are configured for a bolt to pass there through so to bolt the window component 200 to the chamber housing 45.

In various embodiments, the window plate 220 comprises glass and/or another material that is at least partially translucent and/or transparent. For example, in an example embodiment, the window plate 220 is a glass plate or glass pane.

The window plate 220 comprises an optical signal passage array 230 formed therein. FIG. 3 illustrates an example optical signal passage array 230 formed in a window plate 220. FIG. 4 provides a cross-sectional view of a portion of an example optical signal passage array 230. In various embodiments, the optical signal passage array 230 comprises a first array of coupling elements 320 formed on a first surface 240 of the window plate 220 and a second array of coupling elements 330 formed on a second surface 235 of the window plate 220. A plurality waveguides are formed within the volume 225 of the window plate 220. For example, the volume 225 of the window plate 220 is disposed between the first surface 240 and the second surface 235 of the window plate 220.

A respective first coupling element 305A and a respective second coupling element 305B are optically connected and/or coupled to one another via a respective waveguide 310. In various embodiments, the respective waveguide 310 is formed within the volume 225 of the window plate 220. In various embodiments, a waveguide 310 is formed within the volume 225 of the window plate 220 by modifying and/or changing the index of refraction of the material of the window plate 220. For example, in various embodiments, femtosecond laser processing, ion implantation, and/or another process is used to modify and/or change the index of refraction of the material of the window plate 220 to form the plurality of waveguides. For example, the refractive index of a waveguide 310 may differ from the remainder of the volume 225 of the window plate by 0.001 to 0.1, in various embodiments.

In various embodiments, the first array of coupling elements 320 comprises a plurality of first coupling elements 305A in a first configuration. The plurality of first coupling elements 305A are formed on and/or in a first surface 240 of the window plate 220. In various embodiments, the second array of coupling elements 330 comprises a plurality of second coupling elements 305B. The plurality of second coupling elements 305B are formed on and/or in a second surface 235 of the window plate 220. The first surface 240 is opposite the second surface 235.

In various embodiments, the first configuration may be the same or different from the first configuration. For example, in the illustrated embodiment of FIG. 3, the first array of coupling elements 320 is a nine by twenty array of first coupling elements 305A and the second array of coupling elements 330 is a nine by twenty array of second coupling elements 305B. In another example embodiment, the first array of coupling elements 320 is a nine by twenty array of first coupling elements 305A and the second array of coupling elements 330 is an eighteen by ten array of second coupling elements 305B. In various embodiments, the number of first coupling elements 305A and/or the number of second coupling elements 305B is configured based on the application and the number of optical signal pass throughs required by the application. For example, in an example embodiment, the first array of coupling elements 305A could consist of a single first coupling element 305A, tens of first coupling elements 305A, hundreds of first coupling elements 305A, or thousands of first coupling elements 305A, as appropriate for the application.

In various embodiments, the number of first coupling elements 305A and the number of second coupling elements 305B are the same. In various embodiments, the number of first coupling elements 305A and the number of second coupling elements 305B are different. For example, one or more of the waveguides 310 include a respective beam splitter, in an example embodiment, such that one first coupling element 305A is optically coupled to two or more second coupling elements 305B, or vice versa.

In various embodiments, a first coupling element 305A and/or a second coupling element 305B comprises a fiber housing 402 that is bored, drilled, milled, and/or etched into a respective one of the first or second surface 240, 235 of the window plate 220. For example, a first coupling element 305A and/or a second coupling element 305B comprises a fiber housing 402 configured to receive an optical fiber 62 (e.g., 62A-62F) therein. For example, in various embodiments, a fiber housing 402 is configured to retain an optical fiber therein via a friction fit, adhesive (e.g., the optical fiber may be epoxied or glued into the fiber housing 402), and/or the li In various embodiments, a first coupling element 305A and/or a second coupling element 305B comprises an optical element 415 (e.g., 415A, 415B). For example, an optical element 415 may be formed on and/or in a respective one of the first and/or second surface 240, 235 of the window plate. In various embodiments, the optical element 415 is one or more of a diffractive optical component, a refractive optical component, a metasurface, a photonic integrated circuit (e.g., a facet, a grating, a reflector, or an evanescent coupler) and/or the like. In the illustrated embodiments, an optical element 415A (e.g., a metasurface and/or the like) is configured to couple a first coupling element 305A to two waveguides 310 and/or to two second coupling elements 305B. In various embodiments, optical elements 415A may be used to couple an incoming beam path to two or more outgoing beam paths, or vice versa.

In various embodiments, the first coupling elements 305A and the second coupling elements 305B are configured to couple optical signals into and/or out of the respective waveguides 310. For example, the first coupling elements 305A are configured to align respective external beam path systems 66 with respective waveguides 310. For example, the second coupling elements 305B are configured to align respective internal beam path systems 68 with respective waveguides 310. For example, the eternal beam path system 66 comprises an optical fiber 62 and the first coupling element 305A comprises a fiber housing 402, in an example embodiment, and the first coupling element 305A is configured to align a core of the optical fiber 62 with the waveguide 310. In another example, the internal beam path system 68 comprises an optical fiber 62 and the second coupling element 305B comprises a fiber housing 402, in an example embodiment, and the second coupling element 305B is configured to align a core of the optical fiber 62 with the waveguide 310. For example, the internal beam path system 68 may be comprise an optical fiber 62 configured to provide an optical connection and/or coupling between a photonic integrated circuit 69 and the respective second coupling element 305B.

FIG. 5 provides a cross-sectional view of a portion of an example optical signal passage array 230. Similar to the FIG. 4 embodiment, the optical signal passage array 230 of FIG. 5 may comprise a first array of coupling elements 320 formed on a first surface 240 of the window plate 220 and a second array of coupling elements 330 formed on a second surface 235 of the window plate 220. A plurality waveguides 310, such as volumetric waveguides may be formed within the volume 225 of the window plate 220. For example, the volume 225 of the window plate 220 is disposed between the first surface 240 and the second surface 235 of the window plate 220.

In various embodiments, the respective waveguide 310 is formed within the volume 225 of the window plate 220. In various embodiments, a waveguide 310 is formed within the volume 225 of the window plate 220 by modifying and/or changing the index of refraction of the material of the window plate 220. For example, in various embodiments, femtosecond laser processing, ion implantation, and/or another process is used to modify and/or change the index of refraction of the material of the window plate 220 to form the plurality of waveguides 310. For example, the refractive index of a waveguide 310 may differ from the remainder of the volume 225 of the window plate by 0.001 to 0.1, in various embodiments.

In various embodiments, each coupling elements 305 may comprise a fiber housing 402 that is bored, drilled, milled, and/or etched into a respective one of the first or second surface 240, 235 of the window plate 220. For example, each fiber housing 402 may be configured to receive an optical fiber 62 (e.g., 62A-62F) therein. For example, in various embodiments, a fiber housing 402 is configured to retain an optical fiber 62 therein via a friction fit, adhesive (e.g., the optical fiber may be epoxied or glued into the fiber housing 402), and/or the like.

In various embodiments, each coupling element 305 is configured to couple optical signals into and/or out of the respective waveguides 310. For example, the coupling elements 305A,B,C may be configured to position respective external beam path systems 66, which may include optical fibers 62, proximate to respective waveguides 310. Coupling elements 305D,E,F may be configured to position respective internal beam path systems 68, which may include optical fibers 62, proximate to respective waveguides 310. Each of the optical fibers 62 may be positioned proximate to the respective waveguide 310 to provide for evanescent-wave coupling between each optical fiber 62 and a respective waveguide 310. As will be appreciated by those skilled in the art, coupling between two optical components, such as optical fibers 62 and waveguides 310 may be produced by placing the optical fibers 62 proximate to the waveguide 310 such that the evanescent field generated by the optical fiber 62 or the waveguide 310 excites a wave in the other of the optical fiber 62 or the waveguide 310.

Example Method of Fabricating a Window Component and/or a Controlled Environment Chamber FIG. 6 provides a flowchart illustrating various processes, procedures, and/or operations for fabricating a window component 200 and/or a controlled environment chamber 40 that includes a window component 200, according to various embodiments. In various embodiments, various steps may be performed simultaneously (e.g., at least partially overlapping in time) and/or in an order different from that illustrated.

Starting at step 502, a chamber housing 45 is fabricated. For example, various techniques may be used to fabricate a chamber housing 45. In various embodiments, the chamber includes an opening 42.

At step 504, a first array of coupling elements 320 is formed in and/or on the first surface 240 of the window plate 220 and a second array of coupling elements 330 is formed in and/or on the second surface 235 of the window plate 220. For example, in various embodiments, the first array of coupling elements 320 and/or the second array of coupling elements 330 includes one or more fiber housings 402 and fabricating the first array of coupling elements 320 and/or the second array of coupling elements 330 includes boring, drilling, milling, and/or etching the one or more fiber housings 402 into the first and/or second surface 240, 235 of the window plate 220. In an example embodiment, forming the first array of coupling elements 320 and/or the second array of coupling elements 330 comprises forming and/or securing one or more optical elements 415 on and/or in first and/or second surface 240, 235 of the window plate 220.

At step 506, a plurality of waveguides 310 are formed in a volume 225 of the window plate 220. In various embodiments, the plurality of waveguides 310 is formed within the volume 225 of the window plate 220 by modifying and/or changing the index of refraction of respective portions of the material of the window plate 220. For example, in various embodiments, femtosecond laser processing, ion implantation, and/or another process is used to modify and/or change the index of refraction of respective portions of the material of the window plate 220 to form the plurality of waveguides 310. For example, the refractive index of a waveguide 310 may be modified and/or changed from refractive index of the material of the remainder of the volume 225 of the window plate by 0.001 to 0.1, in various embodiments.

At step 508, the window plate 220 is secured within a collar 210. For example, the collar 210 may be secured around a periphery of the window plate 220 such that the first surface 240 and/or the second surface 235 of the window plate 220 is available for optical fiber 62 connections, and/or the like.

At step 510, one or more optical fibers 62 are coupled and/or secured into respective fiber housings 402 of respective first and/or second coupling elements 305A, 305B. For example, one or more optical fibers 62 are secured into respective fiber housings 402 via a friction fit, adhesive, and/or the like.

At step 512, the window component 200 is secured to the chamber housing 45. For Example, the window component 200 may be bolted and/or otherwise fastened to the chamber housing 45 via fastening elements 215. In various embodiments, the window component 200 is secured to the chamber housing 45 so as to environmentally seal opening 42 in the chamber housing 45.

Technical Advantages

In various scenarios, a controlled environment chamber is used to provide a controlled environment. For example, the controlled environment chamber may be a cryogenic and/or vacuum chamber configured for providing a temperature controlled and/or pressure-controlled environment within the controlled environment chamber. For example, experiments may be performed within a controlled environment (e.g., a temperature controlled, humidity controlled, pressure controlled, and/or the like) inside the controlled environment chamber. In various instances, it is desirable to pass optical signals from outside the controlled environment chamber to the inside of a controlled environment chamber, or vice versa. For example, the optical signals may include laser beams used to perform experiments on quantum objects (e.g., ions, atoms, quantum dots, and/or the like) confined within the controlled environment chamber. In another example, the optical signals may include fluorescence signals generated by quantum objects confined within the controlled environment chamber.

However, forming an opening in the housing of the controlled environment chamber to act as an optical fiber feedthrough decreases the efficiency with which the controlled environment within the controlled environment chamber may be controlled. For example, an opening in a housing of a vacuum chamber may limit the pressure to which the environment within the vacuum chamber may be reduced. Moreover, an opening in the housing of the vacuum chamber or using a different material for a feedthrough can add thermal expansion complications or reduce the mechanical stability of the housing. Therefore, technical problems exist regarding how to pass optical signals through the chamber housing of a controlled environment chamber without negatively affecting the operability of the controlled environment chamber.

Various embodiments provide technical solutions to these technical problems. For example, various embodiments provide a window component for a controlled environment chamber that includes coupling components and waveguides optically coupling and/or connecting respective coupling components disposed on a first surface of a window plate and a respective coupling elements disposed on a second surface of the window plate. Optical beams may therefore be passed through the window plate via the waveguides. The window component seals an opening in the housing chamber of the controlled environment chamber and provides means for passing optical signals therethrough. Additionally, the window component retains the mechanical stability of the housing. Thus, various embodiments provide improvements to controlled environment chambers and systems including controlled environment chambers.

Example Controller

In various embodiments, a confinement apparatus 120 disposed within a controlled environment chamber 40 is incorporated into a quantum computer 110 or other system 100. In various embodiments, a quantum computer 110 or other system 100 further comprises a controller 30 configured to control various elements of the quantum computer 110 or other system 100. For example, the controller 30 may be configured to control the voltage sources 50; a cryogenic system, vacuum system, and/or other environmental control system controlling the environment within the controlled environment chamber 40; manipulation sources 64 (e.g., 64A, 64B, 64C); magnetic field generators; active components of external and/or internal beam path systems 66, 68; and/or the like to manipulate and/or cause a controlled evolution of quantum states of one or more quantum objects confined by the confinement apparatus 120, and/or read and/or detect a quantum state of one or more quantum objects within the confinement apparatus 120.

As shown in FIG. 7, in various embodiments, the controller 30 may comprise various controller elements including processing device 605, memory 610, driver controller elements 615, a communication interface 620, analog-digital converter elements 625, and/or the like. For example, the processing device 605 may comprise processing elements, programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing device 605 of the controller 30 comprises a clock and/or is in communication with a clock.

For example, the memory 610 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 610 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language(s), and/or the like), and/or the like. In an example embodiment, execution of at least a portion of the computer program code stored in the memory 610 (e.g., by a processing device 605) causes the controller 30 to perform one or more steps, operations, processes, procedures and/or the like described herein for controlling one or more components of the quantum computer 110 or other system 100 (e.g., voltages sources 50, manipulation sources 64, magnetic field generators, and/or the like) to cause a controlled evolution of quantum states of one or more quantum objects, detect and/or read the quantum state of one or more quantum objects, and/or the like.

In various embodiments, the driver controller elements 615 may include one or more drivers and/or controller elements each configured to control one or more drivers. In various embodiments, the driver controller elements 615 may comprise drivers and/or driver controllers. For example, the driver controllers may be configured to cause one or more corresponding drivers to be operated in accordance with executable instructions, commands, and/or the like scheduled and executed by the controller 30 (e.g., by the processing device 605). In various embodiments, the driver controller elements 615 may enable the controller 30 to operate a manipulation source 64. In various embodiments, the drivers may be laser drivers; vacuum component drivers; drivers for controlling the flow of current and/or voltage applied to longitudinal, RF, and/or other electrodes used for maintaining and/or controlling the confinement potential of the confinement apparatus (and/or other driver for providing driver action sequences and/or control signals to potential generating elements of the confinement apparatus); cryogenic and/or vacuum system component drivers; and/or the like. For example, the drivers may control and/or comprise control and/or RF voltage drivers and/or voltage sources that provide voltages and/or electrical signals to the potential generating elements of the confinement apparatus 120 (e.g., control electrodes and/or RF electrodes). In various embodiments, the controller 30 comprises means for communicating and/or receiving signals from one or more detectors such as optical receiver components (e.g., cameras, MEMs cameras, CCD cameras, photodiodes, photomultiplier tubes, and/or the like). For example, the controller 30 may comprise one or more analog-digital converter elements 625 configured to receive signals from one or more detectors, optical receiver components, calibration sensors, photodetectors of an optics collection system, and/or the like.

In various embodiments, the controller 30 may comprise a communication interface 620 for interfacing and/or communicating with a computing entity 10. For example, the controller 30 may comprise a communication interface 620 for receiving executable instructions, command sets, and/or the like from the computing entity 10 and providing output received from the quantum computer 110 (e.g., from an optical collection system comprising one or more photodetectors) and/or the result of a processing the output to the computing entity 10. In various embodiments, the computing entity 10 and the controller 30 may communicate via a direct wired and/or wireless connection and/or one or more wired and/or wireless networks 20.

Example Computing Entity

FIG. 8 provides an illustrative schematic representative of an example computing entity 10 that can be used in conjunction with embodiments of the present invention. In various embodiments, a computing entity 10 is configured to allow a user to provide input to the quantum computer 110 (e.g., via a user interface of the computing entity 10) and receive, display, analyze, and/or the like output from the quantum computer 110.

As shown in FIG. 8, a computing entity 10 can include an antenna 712, a transmitter 704 (e.g., radio), a receiver 706 (e.g., radio), and a processing device 708 that provides signals to and receives signals from the transmitter 704 and receiver 706, respectively. The signals provided to and received from the transmitter 704 and the receiver 706, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system. In various embodiments, the computing entity 10 comprises a network interface 720 configured to communicate via one or more wired and/or wireless networks 20.

In various embodiments, the processing device 708 may comprise processing elements, programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. The term circuitry may refer to an entirely hardware embodiment or a combination of hardware and computer program products.

The computing entity 10 may also comprise a user interface device comprising one or more user input/output interfaces (e.g., a display 716 and/or speaker/speaker driver coupled to a processing device 708 and a touch screen, keyboard, mouse, and/or microphone coupled to a processing device 708). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 718 (hard or soft), a touch display, voice/speech or motion interfaces, scanners, readers, or other input device. In embodiments including a keypad 718, the keypad 718 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 722 and/or non-volatile storage or memory 724, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A window component of a controlled environment chamber, the window component comprising:

a window plate;

a first array of coupling elements disposed on a first surface of the window plate;

a second array of coupling elements disposed on a second surface of the window plate;

and a plurality of waveguides formed in a volume of the window plate, wherein a respective waveguide of the plurality of waveguides optically connects a respective first coupling element of the first array of coupling elements to a respective coupling element of the second array of coupling elements.

2. The window component of claim 1, further comprising a collar, wherein the window plate is secured within the collar and the collar is configured to couple the window component to a chamber housing of the controlled environment chamber.

3. The window component of claim 1, wherein the window plate comprises glass.

4. The window component of claim 1, wherein the plurality of waveguides are formed in the volume of the window plate by modifying the refractive index of respective portions of the window plate.

5. The window component of claim 1, wherein at least one of the respective first coupling element or the respective second coupling element is a respective fiber housing.

6. The window component of claim 5, wherein the respective fiber housing is configured to receive and retain an optical fiber therein.

7. The window component of claim 6, wherein the respective fiber housing is configured to align a core of the optical fiber with the respective waveguide.

8. The window component of claim 1, wherein the respective first coupling element and the respective second coupling element are configured to couple light at least one of into or out of the respective waveguide.

9. The window component of claim 1, wherein at least one of the respective first coupling element or the respective second coupling element is a respective optical element, wherein the respective optical element is one or more of a diffractive optical component, a refractive optical component, a photonic integrated circuit, or a metasurface.

10. The window component of claim 1, wherein at least one coupling element of the first array of coupling elements is positioned proximate to a respective waveguide of the plurality of waveguides to provide for evanescent-wave coupling between an optical component positioned within the at least one coupling element and the respective waveguide.

11. A method of fabricating a window component of a controlled environment chamber, the method comprising:

forming a first array of coupling elements on a first surface of a window plate;

forming a second array of coupling elements on a second surface of the window plate;

and forming a plurality of waveguides in a volume of the window plate such that a respective waveguide of the plurality of waveguides optically connects a respective first coupling element of the first array of coupling elements and a respective second coupling element of the second array of coupling elements.

12. The method of claim 11, wherein forming the plurality of waveguides in the volume of the window plate comprises modifying the refractive index of respective portions of the window plate.

13. The method of claim 12, wherein the refractive index of the respective portions of the window plate are modified via at least one of femto-second laser processing or ion implantation.

14. The method of claim 11, wherein at least one of (a) forming the respective first coupling element on the first surface of the window plate comprises boring a first fiber housing into the first surface or (b) forming the respective second coupling element on the second surface of the window plate comprises boring a second fiber housing into the second surface.

15. The method of claim 11, wherein at least one of (a) forming the respective first coupling element on the first surface of the window plate comprises forming or securing a first optical element on the first surface or (b) forming the respective second coupling element on the second surface of the window plate comprises forming or securing a second optical element on the second surface.

16. The method of claim 11, further comprising securing the window plate within a collar, wherein the collar is configured to couple the window component to a chamber housing of the controlled environment chamber.

17. A controlled environment chamber comprising:

a chamber housing; and a window component secured to the chamber housing, wherein the window component comprises:

a window plate;

a first array of coupling elements disposed on a first surface of the window plate;

a second array of coupling elements disposed on a second surface of the window plate; and a plurality of waveguides formed in a volume of the window plate, wherein a respective waveguide of the plurality of waveguides optically connects a respective first coupling element of the first array of coupling elements to a respective coupling element of the second array of coupling elements.

18. The controlled environment chamber of claim 17, wherein the controlled environment chamber is at least one of a cryogenic chamber or a vacuum chamber.

19. The controlled environment chamber of claim 17, wherein the window plate comprises glass.

20. The controlled environment chamber of claim 17, wherein the plurality of waveguides are formed in the volume of the window plate by modifying the refractive index of respective portions of the window plate.

* * * * *